(12) United States Patent
Schulz

(10) Patent No.: US 6,890,652 B2
(45) Date of Patent: May 10, 2005

(54) DECORATIVE PAPER BASE WITH IMPROVED OPACITY

(75) Inventor: Hartmut Schulz, Wallenhorst (DE)

(73) Assignee: Technocell Dekor GmbH & Co. KG (DE)

(*) Notice: Subject to any disclaimer, the term of this patent is extended or adjusted under 35 U.S.C. 154(b) by 0 days.

(21) Appl. No.: 10/472,302

(22) PCT Filed: Feb. 9, 2002

(86) PCT No.: PCT/EP02/01366

§ 371 (c)(1),
(2), (4) Date: Mar. 8, 2004

(87) PCT Pub. No.: WO02/079572

PCT Pub. Date: Oct. 10, 2002

(65) Prior Publication Data

US 2004/0137254 A1 Jul. 15, 2004

(30) Foreign Application Priority Data

Mar. 28, 2001 (DE) .......................... 101 15 570

(51) Int. Cl.⁷ ................................. B32B 5/16
(52) U.S. Cl. ................. 428/402; 428/403; 428/404; 428/407; 162/181.5; 162/181.4; 162/181.6; 162/181.1

(58) Field of Search ................. 428/402, 403, 428/404, 407; 162/181.5, 181.4, 181.6, 181.1

(56) References Cited

U.S. PATENT DOCUMENTS

| | | |
|---|---|---|
| 4,239,548 A | 12/1980 | Barnard et al. |
| 4,461,810 A | 7/1984 | Jacobson |
| 5,312,484 A * | 5/1994 | Kaliski ........................ 106/446 |
| 5,336,311 A | 8/1994 | Curtis et al. |
| 5,679,219 A | 10/1997 | Harms et al. |
| 5,690,728 A | 11/1997 | Ravishankar |
| 6,783,631 B2 * | 8/2004 | Schulz ..................... 162/181.1 |

FOREIGN PATENT DOCUMENTS

| | | |
|---|---|---|
| EP | 0 717 145 A1 | 6/1996 |
| EP | 1 036 881 A1 | 9/2000 |
| GB | 1156575 | 7/1969 |
| GB | 2 234 990 A | 2/1991 |

* cited by examiner

*Primary Examiner*—Leszek Kiliman
(74) *Attorney, Agent, or Firm*—Cook, Alex, McFarron, Manzo, Cummings & Mehler, Ltd.

(57) ABSTRACT

A decorative base paper for decorative coating materials having a pigment component of 10 to about 65% by wt., comprises a modified titanium dioxide containing silicon and aluminum, in mixture with a further white pigment.

7 Claims, No Drawings

DECORATIVE PAPER BASE WITH IMPROVED OPACITY

BACKGROUND OF INVENTION

This invention relates to a decorative base paper with a modified titanium dioxide and to decorative coating materials produced using this decorative paper base.

Decorative coating materials, the so-called decorative paper or decorative films, are preferably used for surface coating applications in the manufacture of furniture and for interior work. Decorative films should be understood to refer to a synthetic resin-impregnated or synthetic resin-impregnated and surface-treated, printed or unprinted sheet of paper. Decorative films are bonded or glued to a backing sheet.

Depending on the type of impregnation process used, a distinction is made between decorative films with a paper core impregnated throughout and decorative films on pre-impregnated decorative base paper in the case of which the paper is impregnated only partly on line in the paper making machine. High pressure laminates are laminates which are produced by laminating together several impregnated layers of paper placed on top of each other. These high pressure laminates are generally constructed of a transparent overlay providing maximum surface resistance, a synthetic resin-impregnated decorative sheet of paper and one or several phenol resin-impregnated sheets of kraft paper. Hardboard and chipboard panels, for example, as well as plywood are used as the base.

In the case of low pressure laminates, the synthetic resin-impregnated decorative paper is laminated directly to a base such as a chipboard panel by applying low pressure.

The decorative paper used with the above-mentioned coating materials is used in the white or colored state with or without additional overprint.

The so-called decorative base papers used as starting materials for the manufacture of the above-mentioned coating materials need to satisfy particular requirements such as high opacity for a better coverage effect on the base, a homogeneous formation and grammage of the sheet for an even resin absorption, a high light fastness, a high degree of purity and homogeneity of color for a high-quality reproducibility of the pattern to be printed thereon, a high wet strength for a smooth impregnation process, a corresponding absorbency to achieve the required degree of resin saturation and a dry strength satisfactory during reel-up processes in the paper making machine and during printing in the printing machine.

In general, decorative paper base consists of sulphate pulps of extremely bright whiteness, predominantly of hardwood pulp with a high proportion of pigments and fillers and wet strength enhancing agents, retention aids and fixing agents. Decorative base paper differ from the usual types of paper by their very much higher filler component and the fact that they have not undergone core sizing or surface sizing—commonly applied to paper—with well-known sizes such as alkyl ketene dimers.

The opacity is one of the most important properties of decorative base papers. It characterises the covering ability vis-a-vis the substrate.

A high opacity of the decorative paper base is achieved by adding white pigments. Usually titanium dioxide is used as the white pigment. This pigment ensures a high opacity and an excellent brightness and whiteness of the decorative paper base.

When titanium dioxide is fully or partially replaced by other white pigments, this results in a deterioration of these properties. An adjustment of the opacity is possible only by increasing the proportion of the pigment. However, the proportion of pigment used cannot be increased at will since, in this case, a deterioration of the physical properties, such as the retention behaviour of the pulp suspension, the strength, light fastness and resin absorption is to be expected.

SUMMARY OF THE INVENTION

The invention is therefore based on the object of providing a decorative paper base with improved opacity.

This object is achieved by means of a decorative paper base with a pigment component of 20 to about 65% by weight which contains a modified titanium dioxide pigment. The modified titanium dioxide pigment contains a silicon and an aluminium component. The silicon component, calculated as $SiO_2$, is at least 3% by weight.

The sum total of the silicon and aluminium components, calculated as $SiO_2$ and $Al_2O_3$ respectively, is at least 7% by weight based on the weight of the titanium dioxide.

The modified titanium dioxide contained in the decorative paper base and the decorative paper according to the invention is present in the form of a flake-type precipitate.

DETAILED DESCRIPTION OF THE PREFERRED EMBODIMENTS

Compared with decorative paper with known titanium dioxide pigments, the decorative paper base according to the invention provides a higher opacity while using less titanium dioxide.

Suitable modified pigments to be used according to the invention are after-treated titanium dioxide pigments whose constituent bodies may have been produced according to the so-called SP or CP process. Preferably, the constituent bodies have a rutile structure. Preferably, the constituent bodies are, moreover, stabilised. The stabilisation of the CP constituent bodies can be effected by doping with Al in a quantity of 0.3 to 3.0% by weight calculated as $Al_2O_3$ and a 2 to 15% excess of oxygen during the gas phase oxidation of $TiCl_3$ to $TiO_2$. The stabilisation of the SP constituent bodies can be effected by doping with Al, Sb, Nb or Zn. To achieve a sufficiently high brightness, in particular, light stabilisation with Al is particularly preferred.

The constituent bodies of the pigment can initially be coated with aluminium phosphate. Further coating applications on the pigment using cerium, for example, up to about 0.2% by weight calculated as $CeO_2$ and/or Zn, for example, using up to about 2.5% by weight calculated as ZnO are possible. The coating may also contain nitrate in a quantity of up to about 1% by weight.

The titanium dioxide pigment to be used according to the invention has an increased oil number of at least 25; it has a relatively high $H_2SO_4$ solubility of at least 15% $TiO_2$.

The average particle size of the modified pigment is about 600 to 650 nm.

According to a preferred embodiment, the modified titanium dioxide pigment component of the pigment of the decorative paper base or decorative paper according to the invention is 10 to 90% by weight based on the total pigment content.

The decorative base paper or decorative paper according to the invention may contain further fillers. Suitable fillers are, for example, further titanium dioxides such as those of the rutile or anatase type, talcum, zinc sulphate, kaolin, calcium carbonate and mixtures thereof.

Particularly preferred as a further pigment is a talcum with a very narrow grain size distribution over a D50 of less than about 2 μm. This means that 50% of the talcum particles have a diameter of less than about 3 μm. Talcum with a grain size distribution D50 of less than about 2 μm is particularly preferred.

The specific surface area of the talcum used is in excess of about 30,000 $m^2$/kg. According to a particularly preferred embodiment it is in excess of about 40,000 $m^2$/kg. The specific surface area of conventional types of talcum, in comparison, is in the region of 8,000 to 16,000 $m^2$/kg. The specific surface area has been determined according to DIN 66126.

The talcum component of the pigment mixture can preferably amount to 0.1 to 25% by weight based on the weight of the pigment as a whole.

The filler component of the decorative paper base can be 10 to 65% by weight, in particular 15 to 50% by weight or 20 to 45% by weight based on the weight of the paper. The basis weight of the decorative paper base according to the invention may be in the region of 30 to 300 g/$m^2$ and will usually be 40 to 200 g/$m^2$. The basis weights are selected as a function of particular applications.

Coniferous wood pulps (long-fiber pulps) or hardwood pulps (short-fibered pulps) can be used as pulps for the manufacture of the decorative paper bases according to the invention. It is also possible to use cotton fibers or mixtures of the above-mentioned types of pulp. A mixture of coniferous wood and hardwood pulps in a ratio of 10:90 to 90:10 or, for example, mixtures of coniferous wood and hardwood pulps in a ratio of 30:70 to 70:30 are particularly preferred. The pulp can have a degree of beating of 20° to 60° SR according to Schopper-Riegler.

Preferably, the pulp mixture has a cationically modified pulp fibre component of at least 5% by weight based on the weight of the pulp mixture. A component of 10 to 50% by weight, in particular 10 to 20% by weight, of the cationically modified pulp in the pulp mixture has proved to be particularly advantageous.

Cationically modified pulps are known, for example, from DAS PAPIER, issue 12 (1980), pp 575–579.

According to a particular embodiment of the invention, the cationically modified pulp contained in the paper pulp exhibits an effective cationic charge of 20 to 300 mmole/kg pulp determined according to in-house Method No. 4 of TU Darmstadt. Pulp fibers with a charge density of 30 to 200 mmole/kg, in particular 30 to 100 mmole/kg, are preferred. The term 'effective cationic charge' should be understood to refer to a charge density offset against the charge density of the non-cationised pulp. The charge density of the pulp depends on the quantity of the cationic agent to be used. The quantity of the cationising agent may be 0.005 to 200 g/kg pulp.

The cationic modification of the pulp fibres may be effected by reacting the fibres with epichlorohydrin resin and a tertiary amine or by reaction with quaternary ammonium chlorides such as chlorohydroxypropyl trimethyl ammonium chloride or glycidyl trimethyl ammonium chloride.

According to a preferred embodiment of the invention pulp fibres are used which are cationically modified by an addition reaction of quaternary ammonium compounds exhibiting glycidyl-functional groups with hydroxyl groups of cellulose.

The decorative paper base according to the invention may contain wet strength enhancing agents such as polyamide/polyamine epichlorohydrin resins, other polyamine derivatives or polyamide derivatives, cationic polyacrylates, modified melamine formaldehyde resin or cationised starches. These are added to the pulp suspension. Similarly, the addition of retention aids and other substances such as organic and inorganic colored pigments, dyes, optical brighteners and dispersants is possible.

The decorative paper base according to the invention may be manufactured on a Fourdrinier paper making machine or a Yankee paper making machine. For this purpose, the pulp mixture with a stuff consistency of 2 to 4% by weight can be beaten up to a degree of beating of 30° to 45° SR. In a mixing vat, fillers, such as titanium dioxide and talcum as well as wet strength enhancing agents are added and thoroughly mixed with the pulp mixture. The high density pulp thus obtained is diluted to a stuff consistency of about 1% and, insofar as necessary, further auxiliary agents such as retention aids, defoamers, aluminium sulphate and other auxiliary agents mentioned above are admixed. This low density pulp is passed via the head box of the paper making machines onto the Fourdrinier part. A fiber fleece is formed and, after dewatering, the decorative paper base is obtained which is subsequently dried.

To manufacture decorative paper, the decorative base paper is impregnated or saturated with synthetic resin dispersions usually used for this purpose. Synthetic resin dispersions usually used for this purpose are, for example, those based on polyacrylic or polyacrylomethyl esters, polyvinylacetate, polyvinylchloride or synthetic resin solutions based on phenol/formaldehyde precondensates, urea/formaldehyde precondensates or melamine/formaldehyde precondensates or compatible mixtures thereof.

The impregnation may also take place in the size press of the paper making machine. The decorative base paper may be impregnated such that the paper is not fully impregnated throughout. Such decorative paper is also referred to as pre-impregnated decorative paper. In this case, the resin component introduced into the decorative base paper as a result of the impregnation amounts to 25 to 30% by weight based on the weight of the paper.

After drying, the impregnated paper can be varnished and printed and subsequently applied onto a substrate such as a wooden panel. The varnished and, if appropriate, printed products are generally referred to as decorative films.

The particle size of the titanium dioxide according to the invention is between 400 and 700 nm, the average particle size amounts to 600 to 650 nm. In comparison, the average particle size of conventional titanium dioxide is about 1,500 nm.

The titanium dioxide according to the invention does not form agglomerates on addition to the pulp suspension and consequently guaranteed an optimum distribution of the pigment on the pulp fibers and in the voids between the fibers. The silicon dioxide thus grafted on then acts, in practice, as 'spacer' between the pigment particles.

The invention is illustrated in further detail by way of the following examples:

EXAMPLE 1

A pulp mixture consisting of 70% Eucalyptus pulp and 30% coniferous wood pulp was admixed with 0.6% of epichlorohydrin as wet strength enhancing agent, 0.11% of retention aid and 0.03% of a defoamer for use as the basic mixture. The mixture was adjusted to a pH of 6.5 by means of aluminium sulphate.

A titanium dioxide mixture of 40% titanium dioxide with a silicon dioxide content of 1.456% and 60% of a conventional titanium dioxide (silicon dioxide content less than 0.039%) was added to this mixture.

On a Fourdrinier paper making machine, a decorative paper with a basis weight of 120 g/m² and a titanium dioxide content of 36.5 g/m² was produced.

EXAMPLE 2

To the basic mixture from example 1, a titanium dioxide mixture of 40% of a titanium dioxide with a silicon dioxide content of 6.451% and 60% of a conventional titanium dioxide (silicon dioxide content less than 0.039%) was added. On a Fourdrinier paper making machine, a decorative paper with a basis weight of 120 g/m² and a titanium dioxide content of 36.5 g/m² was produced.

EXAMPLE 3

To the basic mixture from example 1, a titanium dioxide mixture of 20% of a titanium dioxide with a silicon dioxide content of 4.557% and 80% of a conventional titanium dioxide (silicon dioxide content less than 0.039%) was added. On a Fourdrinier paper making machine, a decorative paper with a basis weight of 120 g/m² and a titanium dioxide content of 39.8 g/m² was produced.

EXAMPLE 4

To the basic mixture from example 1, a titanium dioxide mixture of 60% of a titanium dioxide with a silicon dioxide content of 4.557% and 40% of a conventional titanium dioxide (silicon dioxide content less than 0.039%) was added. On a Fourdrinier paper making machine, a decorative paper with a basis weight of 120 g/m² and a titanium dioxide content of 38.8 g/m² was produced.

EXAMPLE 5

Manufacture of the Modified Titanium Dioxide Pigment

A constituent body produced according to the SP process with a rutile structure is present in the form of an aqueous suspension and is beaten at a pH of 10.5. The addition of 2.5% by wt. of $H_2SO_4$ and 5.1% by wt. of $SiO_2$ in the form of a sodium silicate solution, based on the weight of the rutile used, is effected over a period of 30 minutes. A further reduction of the pH takes place after a 30 minute retention period by adding 2.5% by wt. of $H_2SO_4$. 5.1% by wt. of $SiO_2$ in the form of a sodium silicate solution is added and, after a further 30 minutes' stirring, 2.3% by wt. of $Al_2O_3$ is added in the form of an aluminium sulphate solution over 45 minutes. Subsequently, stirring is carried out for 90 minutes and 2.9% by wt. of $Al_2O_3$ in the form of sodium aluminate solution is then added. After a retention time of 60 minutes, washing and drying take place.

By means of this method of operation, a relatively highly inorganically after-treated titanium dioxide pigment with a flaky precipitation of the oxide layer is obtained. The oil number is 40 g/100 g, the $H_2SO_4$ solubility (% of dissolved $TiO_2$) is 19 and the BET surface area is 49 m²/g.

EXAMPLE 6

An SP constituent body stabilised with 0.01% by wt. of Al, calculated as $Al_2O_3$ was after-treated for 15 minutes with 1.0% by wt. of $P_2O_5$ in the form of a disodium hydrogen phosphate solution, 10 minutes with 1.6% by wt. of $Al_2O_3$ in the form of an aluminium sulphate solution and about 4 minutes with 1.4% by wt. of $Al_2O_3$ in the form of a sodium aluminate solution.

After adjusting the pH to 4 with $H_2SO_4$, 3.0% by wt. of $SiO_2$ in the form of sodium silicate solution was added over a period of 30 minutes together with an aluminium sulphate solution (100 g $Al_2O_3$) in an amount such that the pH remained at a constant level of 4. Subsequently, 4.7% by wt. of $Al_2O_3$ in the form of sodium aluminate solution was added in the course of 12 minutes and then 2.2% by wt. of $Al_2O_3$ in the form of an aluminium sulphate solution in the course of 15 minutes.

The oil number was 41 g/100 g, the $H_2SO_4$ solubility (% of $TiO_2$ dissolved) was 19 and the BET surface area 45 m²/g.

COMPARISON EXAMPLE 1

As comparison example V1, a conventional titanium dioxide with a silicon dioxide content of less than 0.039% was added to the basic mixture from example 1. On a Fourdrinier paper making machine, a decorative paper with a basis weight of 120 g/m² and a titanium dioxide content of 37.5 g/m² was produced.

COMPARISON EXAMPLE 2

As comparison example V2, a conventional titanium dioxide with a silicon dioxide content of less than 0.039% was added to the basic mixture from example 1. On a Fourdrinier paper making machine, a decorative paper with a basis weight of 120 g/m² and a titanium dioxide content of 44.8 g/m² was produced.

The titanium dioxide content of the decorative paper was determined according to DIN 54370.

Examples B1 and B4 and comparison examples V1 and V2 were used to determine the opacity with an ACE calorimeter according to DIN 53146.

The results are presented in the following table.

| Sample | Opacity (%) | Titanium dioxide content (g/m²) |
|---|---|---|
| B1 | 94.15 | 36.5 |
| B2 | 94.09 | 36.5 |
| B3 | 94.33 | 39.8 |
| B4 | 94.25 | 38.8 |
| V1 | 93.62 | 38.1 |
| V2 | 94.34 | 44.8 |

The results of the opacity measurement show that a high opacity is achieved by using the modified titanium dioxide with a lower titanium dioxide consumption. In comparison, it can be seen in the reference examples that the opacity achieved by a higher addition of conventional titanium dioxide is no better than that obtained with the modified titanium dioxide.

What is claimed is:

1. Decorative base paper for decorative coating materials with a pigment component of 10 to about 65% by wt., comprising a modified titanium dioxide containing silicon and aluminium in mixture with a further white pigment, said modified titanium dioxide having an oil number of at least 25 and an $H_2SO_4$ solubility of at least 15% $TiO_2$.

2. Decorative base paper according to claim 1, wherein the silicon component, calculated as $SiO_2$, is present in an amount of at least 3% by wt.

3. Decorative base paper according to claim 1, wherein the sum total of the silicon and aluminium components, calculated as $SiO_2$ or as $Al_2O_3$ respectively, is at least 7% by wt. based on the weight of the titanium dioxide.

4. Decorative base paper according to claim 1, wherein the pigment mixture comprises a talcum with a grain size distribution D50 of less than about 3.0 μm.

5. Decorative paper base according to claim 1, wherein the paper contains cationically modified pulp fibers.

6. Decorative base paper according to claim 5, wherein the pulp fibers are modified with quaternary ammonium compounds with a glycidal function.

7. Decorative paper or decorative film comprising a decorative base paper according to claim 1.

* * * * *